United States Patent Office 2,723,297
Patented Nov. 8, 1955

2,723,297

PRODUCTION OF 1,1-DIFLUORO-2,2-DICHLOROETHYLENE

Irving Litant, Flushing, and Charles B. Miller, Lynbrook, N. Y., assignors to Allied Chemical & Dye Corporation, New York, N. Y., a corporation of New York No Drawing. Application April 21, 1954,
Serial No. 424,764

3 Claims. (Cl. 260—653)

This invention relates to the production of 1,1-difluoro-2,2-dichloroethylene, $CCl_2=CF_2$, by the thermal chlorination of 1,1-difluoroethylene, $CH_2=CF_2$.

The principal object of this invention is provision of a process by practice of which it is possible to obtain from 1,1-difluoroethylene excellent yields of 1,1-difluoro-2,2-dichloroethylene. Other objects will appear from the following description and examples.

The various reactions which may take place during the thermal chlorination of 1,1-difluoroethylene are represented by the following equations:

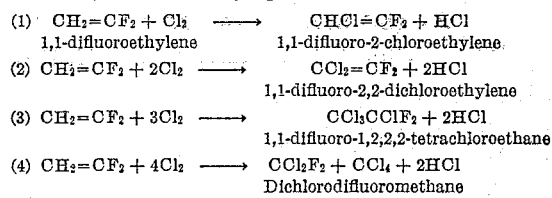

(1) $CH_2=CF_2 + Cl_2 \longrightarrow CHCl=CF_2 + HCl$
    1,1-difluoroethylene    1,1-difluoro-2-chloroethylene
(2) $CH_2=CF_2 + 2Cl_2 \longrightarrow CCl_2=CF_2 + 2HCl$
    1,1-difluoro-2,2-dichloroethylene
(3) $CH_2=CF_2 + 3Cl_2 \longrightarrow CCl_3CClF_2 + 2HCl$
    1,1-difluoro-1,2,2,2-tetrachloroethane
(4) $CH_2=CF_2 + 4Cl_2 \longrightarrow CCl_2F_2 + CCl_4 + 2HCl$
    Dichlorodifluoromethane We have found that excellent yields of 1,1-difluoro-2,2-dichloroethylene suitable for use as monomer may advantageously be obtained by reacting 1,1-difluoroethylene with about 0.5 mol to 2.0 mols of chlorine per mol of 1,1-difluoroethylene in the vapor phase at temperature in the range of about 550° to about 700° C. and in the presence of dichlorodifluoromethane, and recovering the 1,1-difluoro-2,2-dichloroethylene product from the resulting reaction mixture.

In the above process a substantial proportion of the 1,1-difluoroethylene reactant is rapidly converted to 1,1-difluoro-2,2-dichloroethylene, which compound can readily be separated from the reaction mixture. Other chlorinated by-products, both unsaturated and saturated, are also formed which may be recovered and used for certain purposes. The desired product or products may be recovered from the reaction mixture by scrubbing the mixture with water, drying the scrubbed mixture, condensing the dried material and finally subjecting the condensed materials to fractionation.

This invention is based on the discovery that under the prescribed conditions, high conversion of 1,1-difluoroethylene input is effected, and high yield of desired 1,1-difluoro-2,2-dichloroethylene product is obtained. The term "conversion" is used to indicate percent by weight of 1,1-difluoroethylene charged which reacts during the course of the reaction, and "yield" is used herein to denote the percent by weight of 1,1-difluoroethylene consumed which is converted to 1,1-difluoro-2,2-dichloroethylene.

In carrying out the process according to our invention, the gaseous reactants which may be separately vaporized and then mixed are passed into a suitable reactor wherein they are subjected to a temperature within the range of about 550° to about 700° C., and preferably about 625° C. to about 675° C., in the presence of dichlorodifluoromethane for a period sufficient to bring about the desired reaction, and the desired product is then separated from the resulting reaction mixture.

Exit gases from the reactor may be purified and the desired 1,1-difluoro-2,2-dichloroethylene product recovered in any satisfactory manner. For example, the effluent of the reactor may be passed first through one or more water scrubbers which absorb most of the HCl, cool the gas stream and condense part of the high boiling materials which are formed during the reaction. Thereafter, the water-scrubbed gas may be passed through a soda-lime tower to remove traces of acid and then through a calcium chloride drying tower. There is thus produced a gas stream which contains a predominant proportion of 1,1-difluoro-2,2-dichloroethylene (B. P. 18.9° C.). There may also be present varying amounts of unreacted 1,1-difluoroethylene (B. P. —83° C.), 1,1-difluoro-2-chloroethylene (B. P. —19° C.), dichlorodifluoromethane (B. P. —29.8° C.) and high boiling materials having B. P. >22° C. (principally 1,1-difluoro-1,2,2,2-tetrachloroethane). The constituents of this gas may be totally liquefied in a suitable receiver by cooling in a liquid nitrogen trap. Alternatively, condensation may be accomplished by cooling in a Dry Ice-acetone trap. In this case a portion of the gas consisting essentially of unreacted 1,1-difluoroethylene remains uncondensed and may be collected by suitable means. The receiver may then be transferred to a still and fractionally distilled in conventional manner to recover the desired product.

It has been found that carrying out the reaction in the presence of dichlorodifluoromethane brings about such a change in reaction conditions that greatly improved yields of 1,1-difluoro-2,2-dichloroethylene are obtained. Although it is known that the dichlorodifluoromethane passes substantially unchanged through the reactor, the function and mechanics of the dichlorodifluoromethane are not clearly understood. It is believed, however, that the overall action of the dichlorodifluoromethane, from a practical standpoint, may be considered to be that of a true catalyst.

The quantity of dichlorodifluoromethane utilized in practice of the invention process may vary over a relatively wide range. For general practical purposes, an amount in mol ratio of about 1.5 to 2.0 mols for each mol of 1,1-difluoroethylene reactant at the reaction temperatures stated brings about excellent yields of the desired product.

Mol ratios of chlorine to 1,1-difluoroethylene reactant of about 0.5 to 2.0:1, and preferably of about 1 to 2.0:1, yield the greatest quantities of 1,1-difluoro-2,2-dichloroethylene with minimum formation of undesirable products. If excessive amounts of chlorine are employed there is a tendency for formation of overchlorinated by-products. If too little chlorine is employed, the yield of the desired product is decreased and larger amounts of unreacted 1,1-difluoroethylene occur in the reaction mixture, which unreacted material must then be recycled. This impairs the efficiency of the process.

The temperature of reaction may vary from about 550° to about 700° C., and preferably is about 625° to about 675° C. No worth-while reaction appears to take place at a temperature appreciably below about 550° C., and, on the other hand, no significant operating advantages are obtained at temperatures above about 700° C.

Space velocities (volumes of reactant gas at S. T. P. per volume of reaction chamber per hour), while apparently not a wholly controlling factor, may lie in the range of 600 to 6000, and space velocities of 1000 to 4000 have been found to be particularly suitable.

The process of this invention may be carried out in either a batch or continuous manner.

The following example illustrates a method for carrying out our invention. In the example parts are by weight.

Example

A gaseous mixture consisting of 143 parts of 1,1-difluoroethylene (2.23 mols), 266 parts of chlorine (3.75 mols) and 505 parts of dichlorodifluoromethane (4.17 mols) was fed into a reactor comprising an unpacked ½" x 31" nickel tube at a space velocity of 1200. The temperature of the reactor was maintained at 650° C., and the run was continued for an operating period of 1½ hours. The reacted gaseous mixture was passed from the reactor and was bubbled through a series of water scrubbers to remove HCl, cool the gases and condense some of the high boiling products. The gases were then passed through a soda-lime tower to remove traces of acid, dried in a calcium chloride tower and condensed in a Dry Ice-acetone tower. A portion of the gases consisting essentially of unreacted 1,1-difluoroethylene remained uncondensed, and its quantity was measured by passage through a wet gas test meter. The condensed material was then transferred to a fractionating still and the material distilled. 42.0 parts of total unreacted 1,1-difluoroethylene and 509 parts of dichlorodifluoromethane were recovered and recycled for use in the next run. The following products were obtained:

|  | Parts | Percent Yield | Percent Conversion |
|---|---|---|---|
| 1,1-difluoro-2,2-dichloroethylene | 107 | 51.2 | 36.1 |
| 1,1-difluoro-2-chloroethylene | 31.1 | 22.7 | 16.0 |
| High boiling materials as 1,1-difluoro-1,2,2,2-tetrachloroethane | 92.6 | 28.9 | 20.4 |

While the above example describes a preferred embodiment of our invention, it will be understood that departures may be made therefrom within the scope of the specification and claims.

We claim:

1. A process for preparing 1,1-difluoro-2,2-dichloroethylene which comprises subjecting a vaporous mixture of 1,1-difluoroethylene and about 0.5 to 2.0 molecular proportions of chlorine to temperature of about 550° to about 700° C. in the presence of dichlorodifluoromethane, and recovering the 1,1-difluoro-2,2-dichloroethylene product from the resulting reaction mixture.

2. A process for preparing 1,1-difluoro-2,2-dichloroethylene which comprises subjecting a vaporous mixture of 1,1-difluoroethylene and about 1.0 to 2.0 molecular proportions of chlorine to temperature of about 625° to about 675° C. in the presence of dichlorodifluoromethane, and recovering the 1,1-difluoro-2,2-dichloroethylene product from the resulting reaction mixture.

3. A process for preparing 1,1-difluoro-2,2-dichloroethylene which comprises subjecting a vaporous mixture of 1,1-difluoroethylene and about 1.0 to 2.0 molecular proportions of chlorine to temperature of about 625° to about 675° C. in the presence of about 1.5 to 2.0 molecular proportions of dichlorodifluoromethane, and recovering the 1,1-difluoro-2,2-dichloroethylene product from the resulting reaction mixture.

References Cited in the file of this patent

UNITED STATES PATENTS 2,572,913    Calfee et al. _____ Oct. 30, 1951